US012776937B2

(12) United States Patent
Liyanaarachchi et al.

(10) Patent No.: US 12,776,937 B2
(45) Date of Patent: Oct. 27, 2026

(54) PEAK-TO-AVERAGE POWER RATIO MODIFICATION

(71) Applicant: Nokia Technologies Oy, Espoo (FI)

(72) Inventors: Sahan Damith Liyanaarachchi, Lempäälä (FI); Traian Abrudan, Espoo (FI); Selahattin Gokceli, Helsinki (FI); Mikko Säily, Laukkoski (FI); Muhammad Ikram Ashraf, Espoo (FI)

(73) Assignee: Nokia Technologies Oy, Espoo (FI)

( * ) Notice: Subject to any disclaimer, the term of this patent is extended or adjusted under 35 U.S.C. 154(b) by 265 days.

(21) Appl. No.: 18/777,915

(22) Filed: Jul. 19, 2024

(65) Prior Publication Data

US 2025/0030586 A1 Jan. 23, 2025

(51) Int. Cl.
*H04L 27/26* (2006.01)
*H04L 5/00* (2006.01)

(52) U.S. Cl.
CPC ........ *H04L 27/2613* (2013.01); *H04L 5/0051* (2013.01); *H04L 5/0053* (2013.01); *H04L 27/2614* (2013.01)

(58) Field of Classification Search
CPC . H04L 27/2613; H04L 5/0051; H04L 5/0053; H04L 27/2614; H04L 27/2646; H04L 27/262
See application file for complete search history.

(56) References Cited

U.S. PATENT DOCUMENTS

2018/0035423 A1* 2/2018 Wang .................... H04L 5/0007
2020/0036493 A1* 1/2020 Choi ................... H04L 27/2613
2021/0067391 A1 3/2021 Sengupta et al.
2021/0175954 A1* 6/2021 Akkarakaran .......... H04W 8/24
2021/0266209 A1 8/2021 Zach et al.
2021/0377092 A1* 12/2021 Zach ..................... H04W 72/21
2022/0060359 A1 2/2022 Park et al.
2022/0166481 A1* 5/2022 Horn .................... H04B 1/7107
2024/0155507 A1* 5/2024 Gutman .............. H04W 52/262

FOREIGN PATENT DOCUMENTS

CN 113271191 B 8/2022
WO WO 2022/126148 A2 6/2022

OTHER PUBLICATIONS

FI20235834 Search Report dated Feb. 6, 2024, 2 pg.
Ericsson, "On SRS Enhancements Targeting TDD CJT and 8 TX Operation", R1-2301077, 3GPP TSG-RAN WG1 Meeting #112, Athens, GR Feb 27-Mar. 3, 2023 23 pgs.

(Continued)

*Primary Examiner* — Austin J Moreau
(74) *Attorney, Agent, or Firm* — Lippes Mathais LLP

(57) ABSTRACT

According to an example aspect of the present invention, there is provided an apparatus configured to transmit, to a network, a first sounding reference signal, obtain, from the first sounding reference signal and based on a peak-to-average power ratio, PAPR, adjustment signal received in the apparatus from the network, a second sounding reference signal with lower PAPR than the first sounding reference signal, and transmit, to the network, the second sounding reference signal.

12 Claims, 6 Drawing Sheets

(56) References Cited

OTHER PUBLICATIONS

Futurewei (Moderator), “FL Summary #2 on SRS Enhancements”, R1-2304011, GPP TSG RAN WG1 Meeting #112bis-e, e-Meeting, Apr. 17-26, 2023.
C. Sturm and W. Wiesbeck, “Waveform Design and Signal Processing Aspects for Fusion of Wireless Communications and Radar Sensing,” in Proceedings of the IEEE, vol. 99, No. 7, pp. 1236-1259, Jul. 2011, doi: 10.1109/JPROC.2011.2131110.
Y. Rahmatallah and S. Mohan, “Peak-to-average power ratio reduction in OFDM systems: A survey and taxonomy,” IEEE Communications Surveys & Tutorials, vol. 15, No. 4, pp. 1567-1592, Mar. 2013.
K. Anoh and C. Tanriover “On the Optimization of Iterative Clipping and Filtering for PAPR Reduction in OFDM Systems”, IEEE Access, Jun. 2017.
E. M. Kermani et al. “PAPR reduction of OFDM signals using harmony search algorithm”, IEEE 2011, 18th International Conference on Telecommunications, May 2011.

* cited by examiner

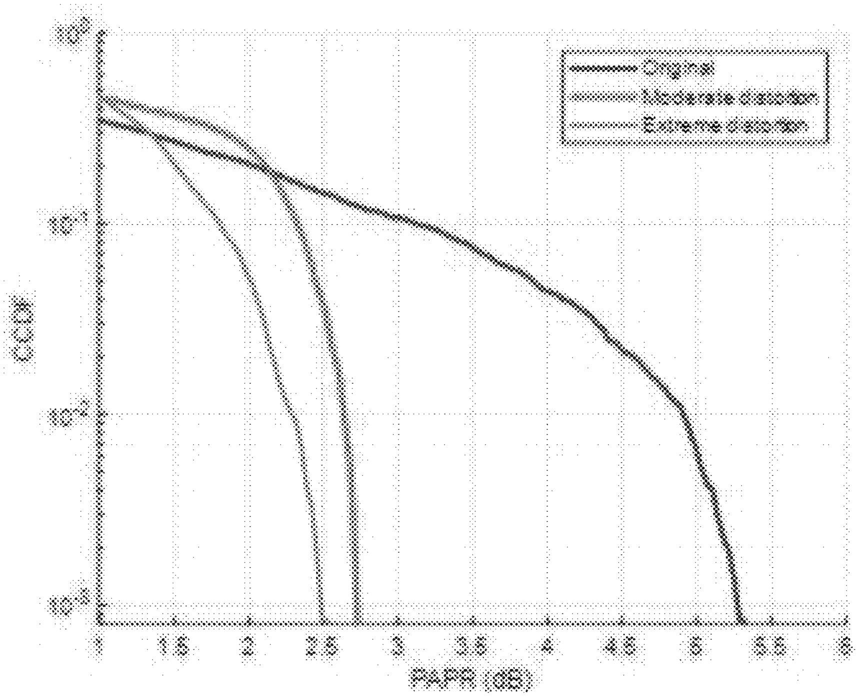
FIGURE 2C
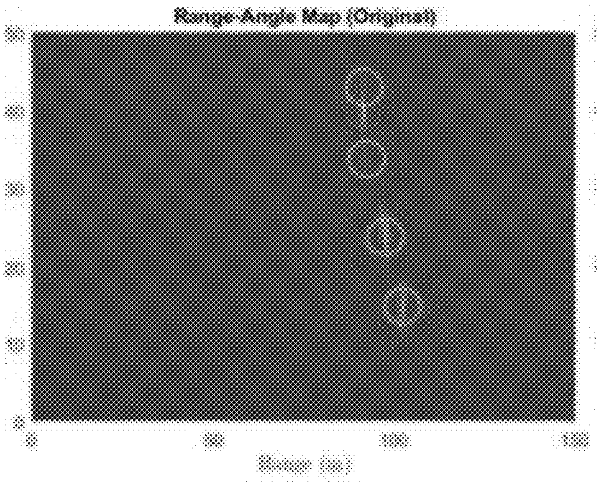
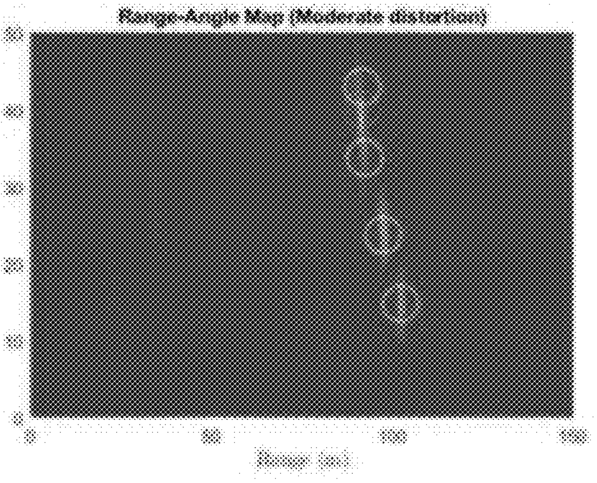
FIGURE 2D
FIGURE 2E

PEAK-TO-AVERAGE POWER RATIO MODIFICATION

FIELD

The present disclosure relates to managing peak-to-average power ratio in a wireless communication system, such as, for example, a cellular communication system.

BACKGROUND

Positioning of user equipments, UEs, is of interest in cellular communication systems. As several positioning mechanisms exist, positioning may be conducted using different techniques. For example, a UE may be furnished with a satellite positioning receiver, with which the UE may determine an estimate of its location and report this estimate to the network.

Alternatively, or additionally, the UE may transmit a sounding reference signal, SRS, to enable the network to determine the estimate of the UE's location based on receiving the SRS. SRS may also be used for other purposes, such as estimating uplink channel quality at the base station side.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core and at least one memory storing instructions that, when executed by the at least one processing core, cause the apparatus at least to transmit, to a network, a first sounding reference signal, obtain, from the first sounding reference signal and based on a peak-to-average power ratio, PAPR, adjustment signal received in the apparatus from the network, a second sounding reference signal with lower PAPR than the first sounding reference signal, and transmit, to the network, the second sounding reference signal.

According to a second aspect of the present disclosure, there is provided an apparatus comprising at least one processing core and at least one memory storing instructions that, when executed by the at least one processing core, cause the apparatus at least to receive, from a user equipment, first a first sounding reference signal and then a second sounding reference signal, the second sounding reference signal having lower peak-to-average power ratio, PAPR, than the first sounding reference signal, and use frequency domain symbols of both the first sounding reference signal and the second sounding reference signal in a positioning or radar process of the user equipment.

According to a third aspect of the present disclosure, there is provided an apparatus comprising at least one processing core and at least one memory storing instructions that, when executed by the at least one processing core, cause the apparatus at least to receive, as part of a positioning process, positioning information relating to a user equipment, determine a peak-to-average power ratio, PAPR, adjustment signal indicating by how much a PAPR may be reduced from a PAPR of a first sounding reference signal, used by the user equipment in the positioning process, and provide the PAPR adjustment signal to the user equipment via a radio-access network.

According to a fourth aspect of the present disclosure, there is provided a method comprising transmitting, from an apparatus and to a network, a first sounding reference signal, obtaining, from the first sounding reference signal and based on a peak-to-average power ratio, PAPR, adjustment signal received in the apparatus from the network, a second sounding reference signal with lower PAPR than the first sounding reference signal, and transmitting, to the network, the second sounding reference signal.

According to a fifth aspect of the present disclosure, there is provided a method comprising receiving, from a user equipment, first a first sounding reference signal and then a second sounding reference signal, the second sounding reference signal having lower peak-to-average power ratio, PAPR, than the first sounding reference signal, and using frequency domain symbols of both the first sounding reference signal and the second sounding reference signal in a positioning or radar process of the user equipment.

According to a sixth aspect of the present disclosure, there is provided a method comprising receiving, as part of a positioning process, positioning information relating to a user equipment, determining a peak-to-average power ratio, PAPR, adjustment signal indicating by how much a PAPR may be reduced from a PAPR of a first sounding reference signal, used by the user equipment in the positioning process, and providing the PAPR adjustment signal to the user equipment via a radio-access network.

According to a seventh aspect of the present disclosure, there is provided an apparatus comprising means for transmitting, to a network, a first sounding reference signal, obtaining, from the first sounding reference signal and based on a peak-to-average power ratio, PAPR, adjustment signal received in the apparatus from the network, a second sounding reference signal with lower PAPR than the first sounding reference signal, and transmitting, to the network, the second sounding reference signal.

According to an eighth aspect of the present disclosure, there is provided an apparatus comprising means for receiving, from a user equipment, first a first sounding reference signal and then a second sounding reference signal, the second sounding reference signal having lower peak-to-average power ratio, PAPR, than the first sounding reference signal, and using frequency domain symbols of both the first sounding reference signal and the second sounding reference signal in a positioning or radar process of the user equipment.

According to a ninth aspect of the present disclosure, there is provided an apparatus comprising means for receiving, as part of a positioning process, positioning information relating to a user equipment, determining a peak-to-average power ratio, PAPR, adjustment signal indicating by how much a PAPR may be reduced from a PAPR of a first sounding reference signal, used by the user equipment in the positioning process, and providing the PAPR adjustment signal to the user equipment via a radio-access network.

According to a tenth aspect of the present disclosure, there is provided a non-transitory computer readable medium having stored thereon a set of computer readable instructions that, when executed by at least one processor, cause an apparatus to at least transmit, to a network, a first sounding reference signal, obtain, from the first sounding reference signal and based on a peak-to-average power ratio, PAPR, adjustment signal received in the apparatus from the network, a second sounding reference signal with lower PAPR than the first sounding reference signal, and transmit, to the network, the second sounding reference signal.

According to an eleventh aspect of the present disclosure, there is provided a non-transitory computer readable medium having stored thereon a set of computer readable instructions that, when executed by at least one processor, cause an apparatus to at least receive, from a user equipment, first a first sounding reference signal and then a second sounding reference signal, the second sounding reference signal having lower peak-to-average power ratio, PAPR, than the first sounding reference signal, and use frequency domain symbols of both the first sounding reference signal and the second sounding reference signal in a positioning or radar process of the user equipment.

According to a twelfth aspect of the present disclosure, there is provided a non-transitory computer readable medium having stored thereon a set of computer readable instructions that, when executed by at least one processor, cause an apparatus to at least receive, as part of a positioning process, positioning information relating to a user equipment, determine a peak-to-average power ratio, PAPR, adjustment signal indicating by how much a PAPR may be reduced from a PAPR of a first sounding reference signal, used by the user equipment in the positioning process, and provide the PAPR adjustment signal to the user equipment via a radio-access network.

BRIEF DESCRIPTION OF THE DRAWINGS

FIG. 2C illustrates the improvement of the PAPR, through the CCDF of the PAPR values;

FIGS. 2D and 2E are range-angle maps with unmodified and modified SRS to reduce PAPR;

DETAILED DESCRIPTION

Processes are described herein which enable lowering a transmit power in a user equipment, UE, of a signal, such as, for example, a positioning sounding reference signal, SRS. More precisely, lowering a peak-to-average power ratio, PAPR, of a signal, such as the SRS, without significantly affecting a quality of a process the signal is transmitted in. The signal may be provided in a positioning or a radar process, for example. The lowered transmit power is a beneficial technical effect in terms of conserving energy and extending battery life in UEs which are battery-powered. The user equipment obtains a reduced-PAPR waveform and provides the signal, such as SRS, using both an original waveform and the reduced-PAPR waveform. Signals received in the network using both waveforms may be used in a process, such as in a positioning process, for example.

Figure 1:
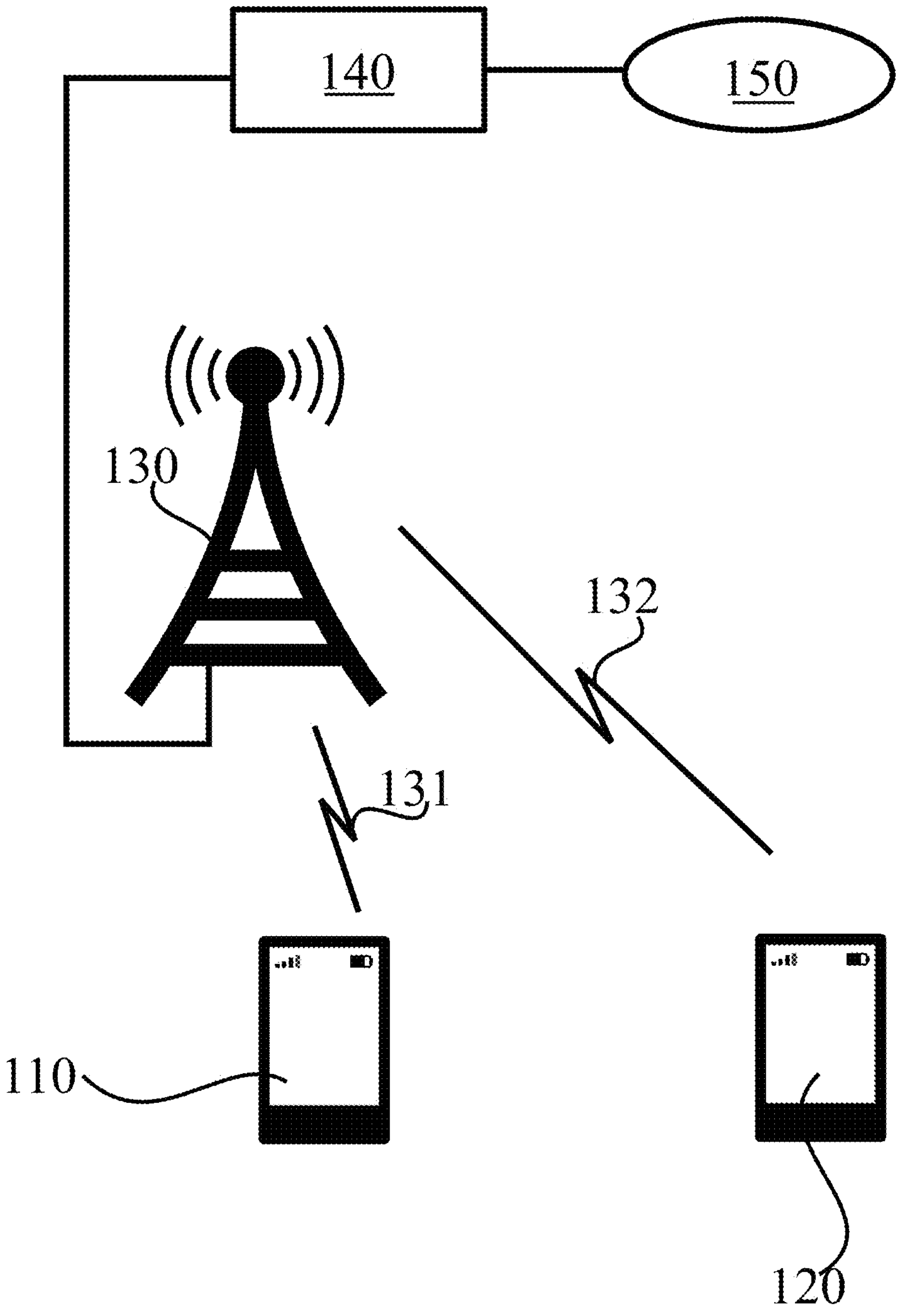
FIG. 1 illustrates an example system in accordance with at least some embodiments of the present invention.

FIG. 1 illustrates an example system in accordance with at least some embodiments of the present invention. This system includes a base station 130 in communication with UEs 110, 120. Radio link 131 connects base station 130 with UE 110, and radio link 132 connects base station 130 with UE 120. The radio links 131, 132 may be bidirectional, comprising an uplink, UL, to convey information from the respective UE 110, 120 toward the base station 130 and a downlink, DL, to convey information from the base station 130 toward the respective UE 110, 120. Base station 130 may be a distributed base station comprising a centralized unit, CU, tasked with a radio resource control, RRC, protocol and one or more distributed unit, DU, tasked with a radio link control, RLC, protocol, for example.

Base station 130 is further coupled communicatively with core network node 140, which may comprise, for example, a mobility management entity, MME, location management function, LMF, or access and mobility management function, AMF. The core network node 140 may be coupled with further core network nodes, and with a network 150, which may comprise the Internet or a corporate network, for example. The system may communicate with further networks via network 150. Examples of the further core network nodes, which are not illustrated in FIG. 1 for the sake of clarity, include gateways and subscriber information repositories.

Radio links 131, 132 may be in accordance with a long-term evolution, LTE, technology, or a new radio, NR, technology, which is also known as fifth generation, 5G, for example. LTE and NR are standardized by the $3^{rd}$ generation partnership project, 3GPP. In particular, radio links 131, 132 may comprise a set of subbands, each subband being a frequency resource in use between the base station and UE. There may be, for example, up to 12 or up to 18 subbands. There may be more than 18 subbands. The subbands in the set of subbands may form a contiguous block of subbands in frequency space, for example.

For many different reasons, such as network management, public safety and enabling various location-based services, positioning a UE 110, 120 is of interest. By positioning it is meant a process which produces an estimate of the UE's geographic location, in geo-coordinates or specified in other ways, such as a street address or a coordinate system specific to the cellular network.

For example, a positioning process may be based on positioning SRS transmitted by the UE 110, 120 in the uplink, which are received in more than one base station. The positioning SRS is designed to have enough range to reach also base stations other than the one controlling the serving cell. Further, positioning SRS aim to cover the full used bandwidth, where resource elements are spread across the different orthogonal frequency division multiplexing, OFDM, symbols so as to cover, optimally, all subcarriers. Therefore, positioning SRS may be designed with a comb-based pattern similar to positioning reference signal, PRS, used in the downlink direction. Positioning SRS is designed with low PAPR to begin with, however, reducing its PAPR further produces further benefits, as will be discussed herein in the context of, for example, NR, LTE and sixth-generation, 6G, technology.

Several different types of UE 110, 120 exist. Smartphones, connected car connectivity devices, Internet of Things devices and reduced-capacity UEs serve different purposes. Smartphones, for example, are equipped with high-definition colour displays and powerful processors. As a consequence, smartphones must typically be re-charged every few days, since they consume a lot of electrical power. Connected car UE connectivity devices are configured to connect a car to a cellular network and thus need not, necessarily, have a display, and furthermore may be powered from the car's electrical system, which provides ample power for the device. Internet of Things, IoT, devices may be more energy-constrained than smartphones, for example. IoT devices may be smart utility meters or connected motion sensors, for example. Reduced-capacity, RedCap, UEs have even longer battery life than typical IoT devices. Reduced-capacity UEs may be even more extensively engineered to minimize energy consumption than IoT devices.

UEs may thus be energy-constrained devices, such as reduced-capacity or low power high accuracy positioning, LPHAP, UEs, which require power savings. UE devices, such as energy-constrained UE devices, typically have non-linear power amplifiers, PAs, and thus reducing the PAPR helps in effectively linearizing the output at the PA by enabling operation of the PA in a linear operating region. A more linear output enhances overall positioning quality and enables more precise power control of transmissions.

In a positioning process as described herein, an initial SRS waveform is generated at the UE. This initial, or first, waveform may be generated based on at least one of: 3GPP standards or positioning requirements. The first waveform may alternatively be stored in the UE and retrieved from a memory of the UE for use. Examples of positioning requirements include accuracy and latency, wherein latency is the time delay in obtaining the location estimate.

The UE then transmits an SRS in the uplink direction based on the first waveform. In the core network, an LMF determines, based on the SRS transmitted by the UE using the first waveform, a PAPR level requirement depending on, for example, one or more of UE capability, UE mobility, and channel conditions. Examples of channel conditions include such as line of sight, LOS or non-line of sight, NLOS, status, signal to interference-plus-noise ratio, SINR, reference signal received power, RSRP, reference signal received quality, RSRQ. The PAPR requirement describes an extent to which PAPR may be reduced for transmission of a second SRS from the UE. For example, if channel conditions are favourable for the UE, such as a static channel, the PAPR requirement may indicate a greater PAPR reduction. On the other hand if channel conditions are difficult, such as in a high-mobility case, then the PAPR requirement may indicate a lesser PAPR reduction. Therefore, the LMF may be configured to determine the PAPR requirement based, at least in part, on the radio channel conditions between the UE and the serving base station. The LMF indicates the selected PAPR requirement to the UE in the form of a PAPR adjustment signal, for example in LTE positioning protocol, LPP, signaling. The PAPR adjustment signal indicates to the UE, an extent to which PAPR is to be reduced from the PAPR of the first waveform.

The UE transmitting SRS using a first waveform may be referred to as the UE transmitting a first SRS. Likewise, the UE transmitting SRS using a second waveform may be referred to as the UE transmitting a second SRS.

The UE may acknowledge back to the LMF, responsive to receiving and accepting the PAPR adjustment signal, its acceptance of the proposed PAPR level, or the UE may alternatively propose different PAPR level. If the UE proposes a different PAPR level, the LMF may send a corrected PAPR adjustment signal, instructing the UE to use the different PAPR level instead of the PAPR level indicated by the original PAPR adjustment signal.

Responsive to the PAPR adjustment signal or, where present, the corrected PAPR adjustment signal, the UE applies a PAPR reduction algorithm to obtain, from the first waveform, a second waveform with lower PAPR. The PAPR adjustment signal or, where present, the corrected PAPR adjustment signal, are used in selecting an extent of PAPR reduction to obtain, when using the PAPR reduction algorithm. The UE then transmits an SRS with the second waveform to the network. An example of a PAPR reduction algorithm is the iterative clipping and filtering, ICF, algorithm, described in reference [1]. Another example of a PAPR reduction algorithm is based on a harmony search and described in reference [2].

The base station serving the UE may then use frequency-domain symbols from the SRS transmitted using the first waveform together with frequency-domain symbols from the SRS transmitted using the second waveform to perform positioning or radar processing for the UE. The process can be repeated, for example depending on radio channel conditions between the UE and the serving base station, by sending at least one second PAPR adjustment signal from the LMF to the UE. When the second PAPR adjustment signal is sent to the UE, the UE obtains, from the first or the second waveform, a third waveform with lower PAPR than the second waveform, wherein the PAPR of the third waveform is indicated by the second PAPR adjustment signal. The UE then transmits SRS using the third waveform. The base station uses frequency-domain symbols from the SRS transmitted using the first waveform, second waveform and third waveform in the positioning or radar process.

For example, in case of static radio channel, or low-mobility radio channel conditions, the PAPR may be reduced more than in a high-mobility case, and the LMF may thus indicate a PAPR adjustment signal which requires the UE to reduce PAPR more for the second waveform, than in the case of a high-mobility UE. Reducing the PAPR results in reducing the transmit power at the UE, providing savings in energy and reducing the level of interference in the system. Also non-linearity caused by the PA of the UE is reduced, which is a further benefit.

In some embodiments, the serving base station, rather than the LMF, determines the content of the PAPR adjustment signal which the UE uses in obtaining the second SRS waveform. The base station may send this PAPR adjustment signal as part of allocating resources for the UE to use in transmitting SRS, for example.

Figure 2A:
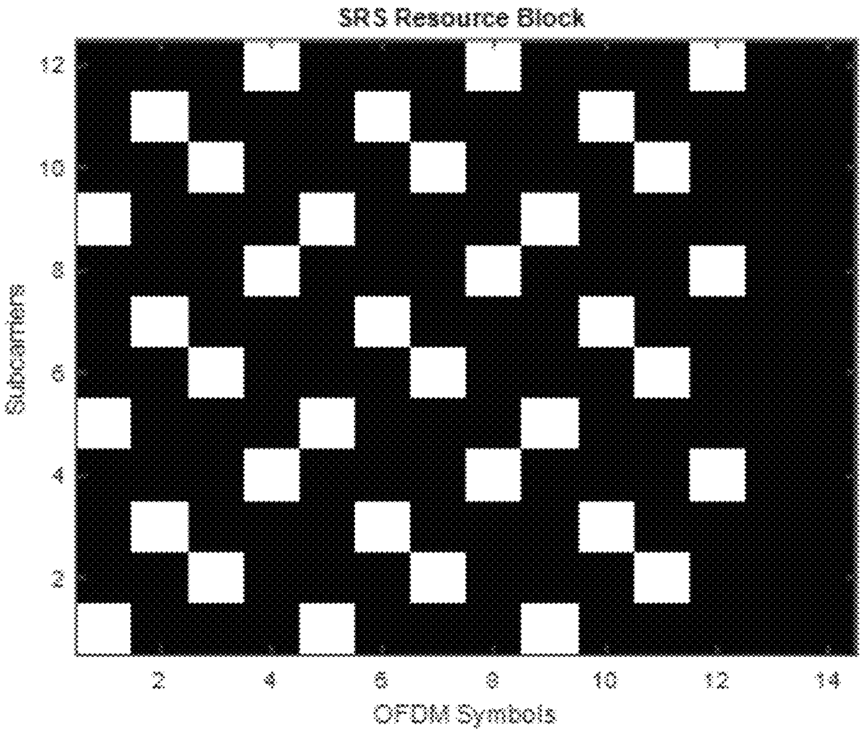
FIG. 2A illustrates an example SRS resource block.

FIG. 2A illustrates an example SRS resource block. To reduce PAPR, frequency-domain symbols of the SRS waveform are modified. A typical resource block used for SRS positioning is illustrated in FIG. 2A, where a comb size of 4 and 12 OFDM symbols are used. Denoting the time-domain samples of the uplink waveform for each OFDM symbol $x=[x_0, \ldots, x_{M-1}]$, where $x_m$ is the vector of samples for the $m^{th}$ OFDM symbol, the PAPR of the first time-domain waveform, without PAPR reduction, may be expressed as $$PAPR(x) = 10\log_{10}\frac{\max_{n=0,1,\ldots,NM-1}\{|x[n]|^2\}}{\frac{1}{NM}\sum_{n=0}^{NM-1}\{|x[n]|^2\}}. \quad (1)$$

Here, max $\{\cdot\}$ represents the maximum operator, $|x|$ is the absolute value of a complex number x, and N is the number of time-domain samples for a particular OFDM symbol. Then, depending on the UE capability, it is necessary to reduce the PAPR in equation (1) to a certain level $PAPR_{level}$.

Any PAPR algorithm may be used for PAPR reduction in the UE. However, in applying this algorithm, it will result in modifying the original SRS symbols. This process can be represented by $$X_{modified}(a, b) = X_{original}(a, b) + C(a, b), \quad (2)$$

where a and b are the subcarrier and OFDM symbol index, $X_{modified}(a, b)$ is the modified SRS symbol on a resource element, $X_{original}(a, b)$ is the original SRS symbol on a resource element, and C(a, b) is the distortion caused to the original SRS symbol. Therefore, there is an inherent trade-off between the level of PAPR reduction needed and how much the frequency-domain symbols are distorted when compared with the original, unmodified SRS constellation.

The level of distortion may be quantified through a metric defined as $$\text{Distortion level[dB]} = 10\log\frac{\left(\sum_a \sum_b |X_{modified}(a, b) - X_{original}(a, b)|^2\right)}{P_{TX}}. \quad (3)$$

In addition, reducing the PAPR of the waveform results in reducing the transmit power of the waveform. This can be quantified through the metric $$\text{Power reduction [\%]} = \frac{P_{TX} - P_{modified}}{P_{TX}} \times 100, \quad (4)$$

which measures how much of power is saved compared to the power of the first, unmodified SRS waveform.

To illustrate the process, the afore-mentioned ICF algorithm is used for PAPR reduction, along with example parameters. Two different distortion levels are defined to evaluate the performance in power saving and sensing performance. They are defined as moderate distortion and extreme distortion, respectively. For a UE uplink transmit power of 20 dBm, the distortion levels in equation (3), above, are given as −13.6 dB and −6.25 dB, respectively, for the two cases. A higher value indicates higher distortion. Hence, the latter has severe distortion when compared with the former.

Figure 2B:
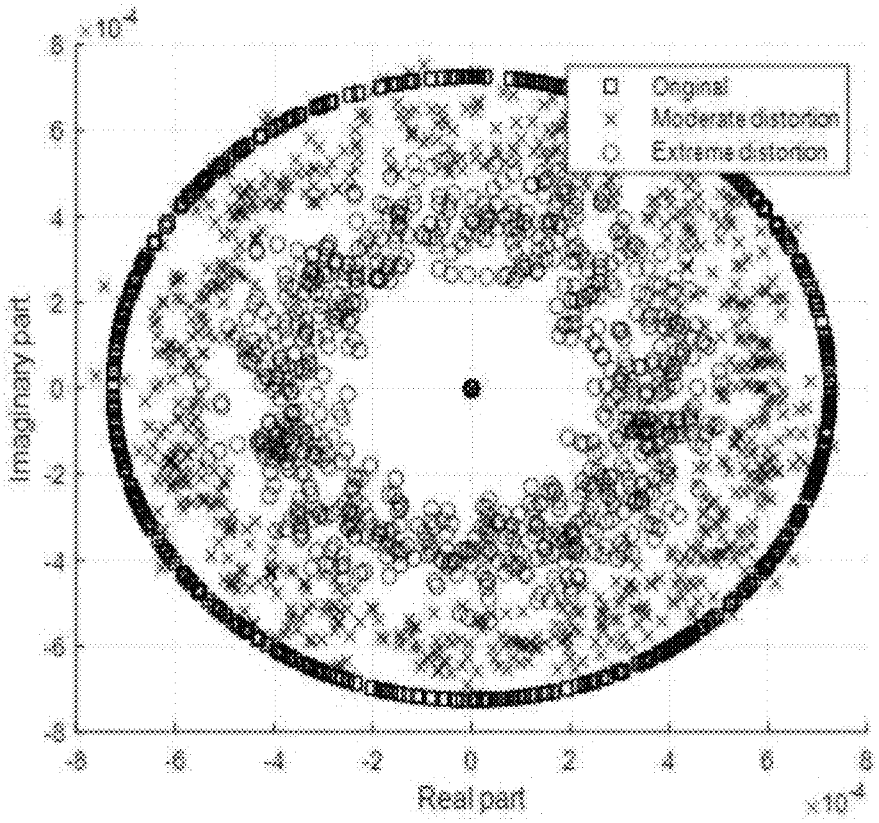
FIG. 2B depicts how PAPR reduction has impacted on the frequency-domain samples for the two distortion levels.

FIG. 2B depicts how PAPR reduction has impacted on the frequency-domain samples for the two distortion levels. The original transmitted symbols of the first waveform are circularly distributed with same radius, since they are, in this example, a Zadoff-Chu sequence. However, when moderate distortion is applied, the symbols overall have a circular distribution, but the radii of different symbols vary. In addition, the mean radius of the symbols has decreased in comparison to the original waveform's mean radius. This generates the lowered PAPR. For the extreme distortion case, a similar behaviour is observed, with even a lesser mean radius.

As illustrated in FIG. 2B, increasing the distortion, namely the PAPR reduction, causes to reduce the mean radius of the constellation symbols. Hence, this reduces the transmitted power of the SRS waveform as in equation (4), that is, distortion is increased to obtain power saving. For the moderate distortion and extreme distortion cases, the metric values are 28.0% and 69.7%, respectively.

FIG. 2C illustrates the improvement of the PAPR, through the complementary cumulative distribution function, CCDF, of the PAPR values. On the horizontal axis, the left-most curve corresponds to extreme distortion, the centre curve corresponds to moderate distortion and the right-most curve is the original, first-waveform case. For the original SRS waveform, 0.1% point corresponds to 5.3 dB, whereas it is 2.7 dB and 2.5 dB, respectively, for the moderate and extreme distortion cases, giving gains of 2.6 dB and 2.8 dB. Therefore, a substantial reduction in PAPR can be obtained, and the highly non-linear PA at the UE can be made to operate in a linear region.

The waveform with lowered PAPR is transmitted towards the base station, as described herein above. The base station processes the frequency-domain symbols it has received to obtain the necessary estimates of the UE. The base station may be unaware of the modified, lowered-PAPR uplink frequency-domain SRS symbols, and it may be unable to exactly recreate them. This is because the UE may in principle have used any PAPR reduction algorithm, with different parameters. Hence, the base station may use the un-modified, first-waveform SRS symbols for positioning/radar processing of the UE.

The received uplink symbols and the un-modified SRS symbols can be then used to obtain, for example, range-angle maps, as illustrated in FIGS. 2D and 2E. FIG. 2D shows the range-angle map when the original, unmodified first-waveform constellation is used at the UE. This clearly shows the locations of the UE and scatterers. FIG. 2E shows the map when moderate distortion is applied in the second waveform. The UE can still be detected with almost the same maps as in the original case. In simulations, even the extreme distortion often results in very similar conclusions as to the location of the UE.

When PAPR reduction is applied, as observed in FIG. 2B, the uplink power of the waveform is reduced compared to the first, unmodified waveform. In addition, the base station does not know the modified SRS symbols to use for uplink processing. However, the UE can still be detected quite well. Therefore, reducing the PAPR of the uplink positioning SRS waveform does not necessarily degrade the positioning/sensing performance at all in practical terms. Since the map of moderate distortion is equivalent to the original map, it can be applied when the channel conditions are harsh, such as in high mobility conditions. On the other hand, if the channel conditions are known to be good, for example static, or low mobility, extreme distortion can be applied, that is, a larger PAPR reduction may be applied from the first waveform to the second waveform.

On the other hand, in case the base station does know the modified uplink SRS waveform, that is, the second waveform, and uses it for positioning/radar processing. In this case, in the extreme distortion case the UE can still be reliably detected. However, when moderate distortion is used, the performance is essentially the same as in the case where the base station doesn't know the second waveform in advance. Therefore, the base station does not necessarily need to use the modified SRS symbols, and thus, it does not need to complicate its uplink receive processing and can still use the processing as in conventional SRS transmission without modifications. The base station may know the second waveform in case the UE advises the network of a PAPR reduction algorithm it intends to use, for example when acknowledging the PAPR adjustment signal to the network. The base station may look at the acknowledgement itself, or the base station may receive from the LMF and indication, determined by the LMF from the acknowledgement, concerning which algorithm the UE intends to use.

Overall, modifying the SRS waveform for PAPR reduction helps in minimizing the PAPR of the transmitted SRS waveform, and this process does not materially negatively impact positioning or sensing performance. The original SRS sequence may be used at the base station in receiving also the modified, lowered-PAPR SRS waveform. Modifying the SRS waveform for PAPR reduction allows to reduce uplink transmit power of the SRS waveform, while also reducing transmission non-linearity due to the UE's PA. This is particularly important for reduced-capacity and LPHAP devices, where power saving is highly relevant. On the other hand, depending on the channel conditions, the PAPR level can be varied more than once to obtain the required trade-off between the positioning/sensing performance and the power savings, that is, accuracy vs energy efficiency.

Figure 3:
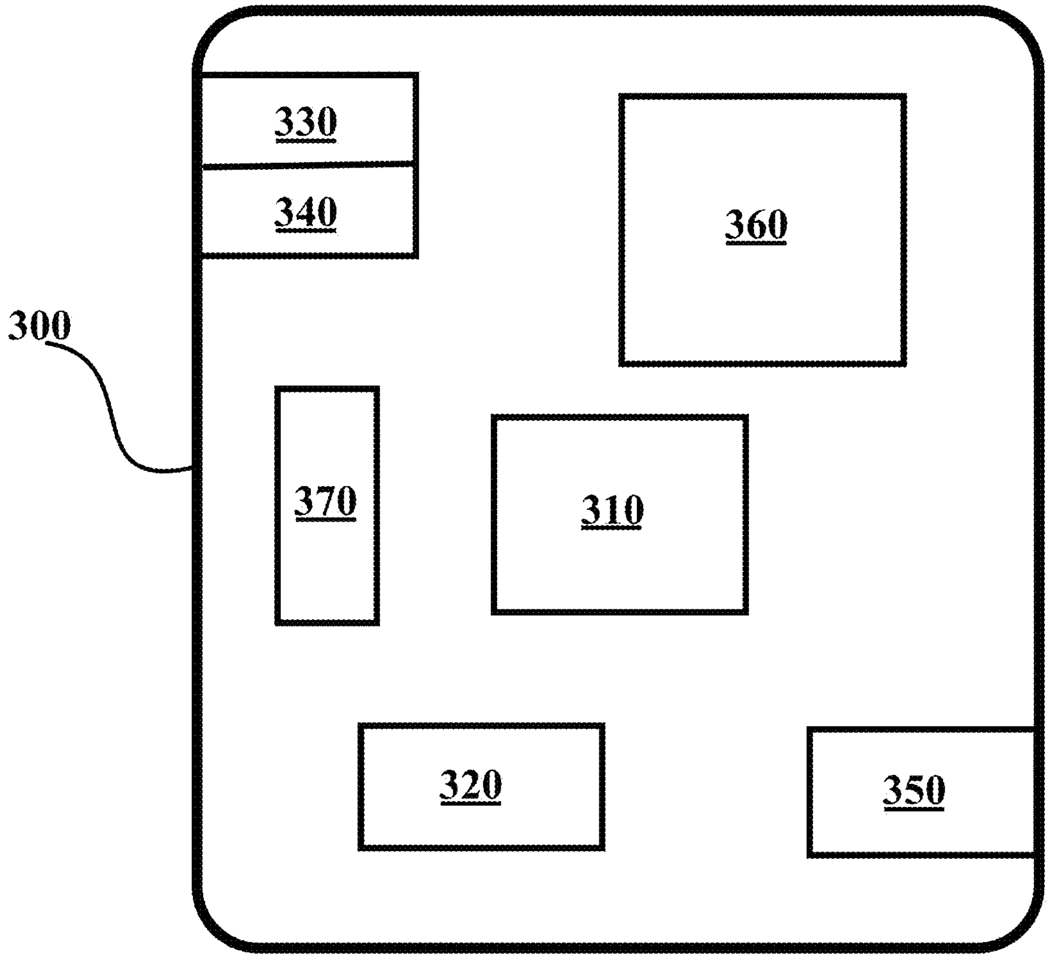
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a mobile communication device such as UE 110, 120 or, in applicable parts, base station 130 of FIG. 1. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. When processor 310 comprises more than one processor, device 300 may be a distributed device wherein processing of tasks takes place in more than one physical unit. Processor 310 may be a control device. A processing core may comprise, for example, a Cortex-A8 processing core manufactured by ARM Holdings or a Zen processing core designed by Advanced Micro Devices Corporation. A processing core or processor may be, or may comprise, at least one qubit. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310, optionally together with memory and computer instructions, may be means for performing method steps in device 300, such as transmitting, obtaining, receiving, performing, using, determining and providing. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a UE or base station, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may be a computer readable medium. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300. Memory 320 may be transitory or non-transitory. The term "non-transitory", as used herein, is a limitation of the medium itself (that is, tangible, not a signal) as opposed to a limitation on data storage persistency (for example, RAM vs. ROM).

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker or a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
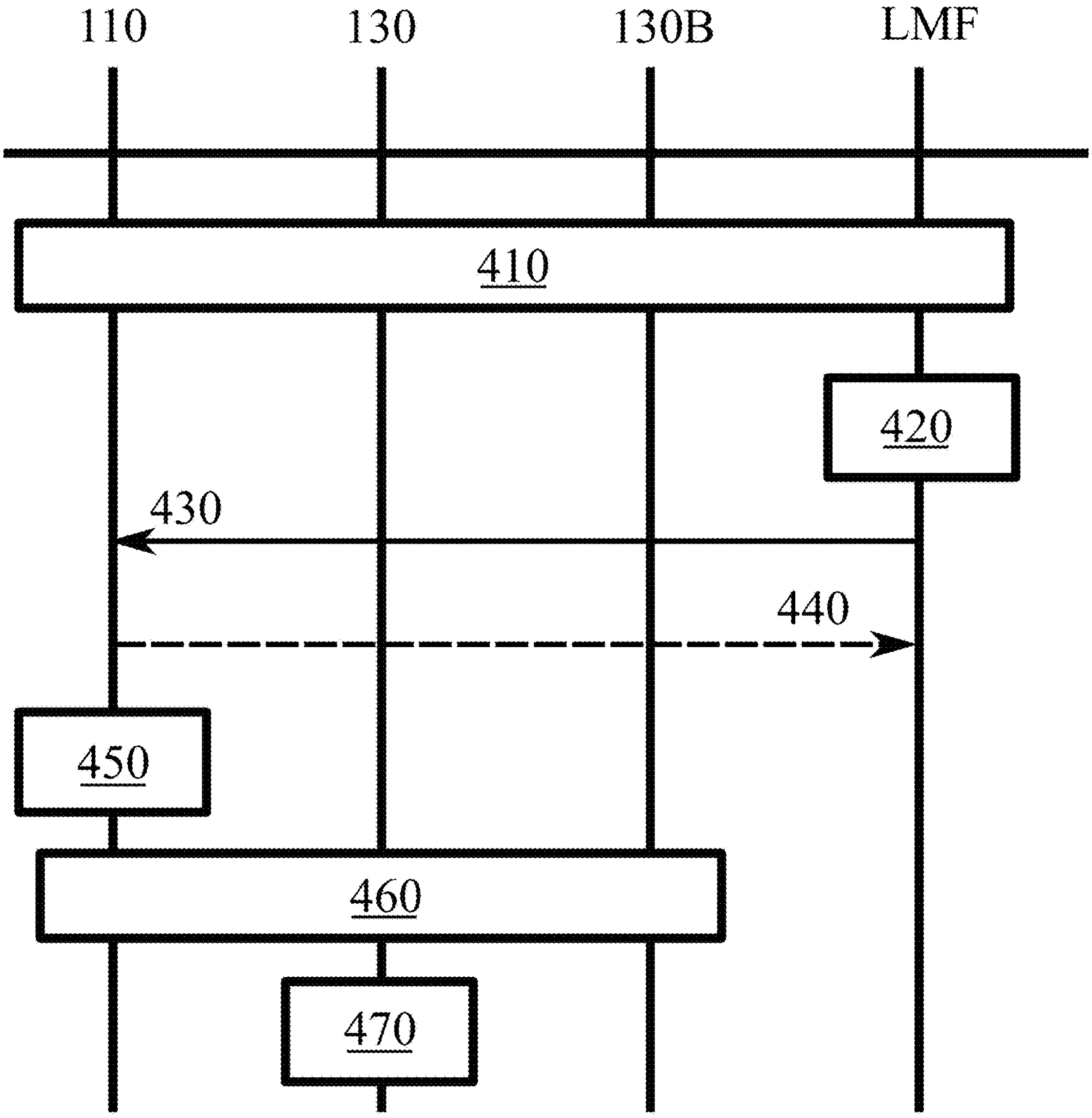
FIG. 4 illustrates signalling in accordance with at least some embodiments of the present invention.

FIG. 4 illustrates signalling in accordance with at least some embodiments of the present invention. On the vertical axes are disposed, from the left to the right, UE 110, base station 130, a neighbour base station, and the LMF on the right. Time advances from the top toward the bottom.

In phase 410, a positioning process is performed, at least partly, using the first waveform. As described herein above, the UE may retrieve or generate the first waveform based on a pre-configured list, radio channel conditions and/or industry standards, for example. In phase 420, the LMF determines, based on UE capability in terms of, for example, power, bandwidth and mobility, the PAPR adjustment signal which specifies, by how much may the PAPR of the first waveform be reduced by the UE for the second waveform. Phase 410 comprises transmission of SRS using the first waveform from the UE.

In phase 430, the LMF provides the PAPR adjustment signal to the UE. In optional phase 440, the UE acknowledges the PAPR adjustment signal. In some embodiments, the message of phase 440 informs the base station of the adjusted, second waveform with reduced PAPR that the UE intends to use, so that base station 130 may use it in receiving the SRS using the second waveform. In some embodiments, the message of phase 440 informs the base station of the algorithm the UE will use in reducing PAPR of the first waveform. This, too, will assist the base station in receiving the SRS using the second waveform.

In phase 450, the UE obtains, from the first waveform and based on the PAPR adjustment signal of phase 430, the second waveform with lower PAPR than the first waveform. Phases 450 and 440, where phase 440 is present, may happen in either order or at least in part concurrently.

In phase 460, UE 110 transmits SRS using the second waveform, which is received by both base stations. Of note, is that instead of base stations, these units may be transmit/receive points, TRPs. Finally in phase 470, base station 130 performs a positioning or radar process of the user equipment based on frequency domain symbols of both the sounding reference signal received in base station 130 using the first waveform and the sounding reference signal received in base station 130 using the second waveform. Phases 410 to 470 may be comprised in the positioning process.

Figure 5:
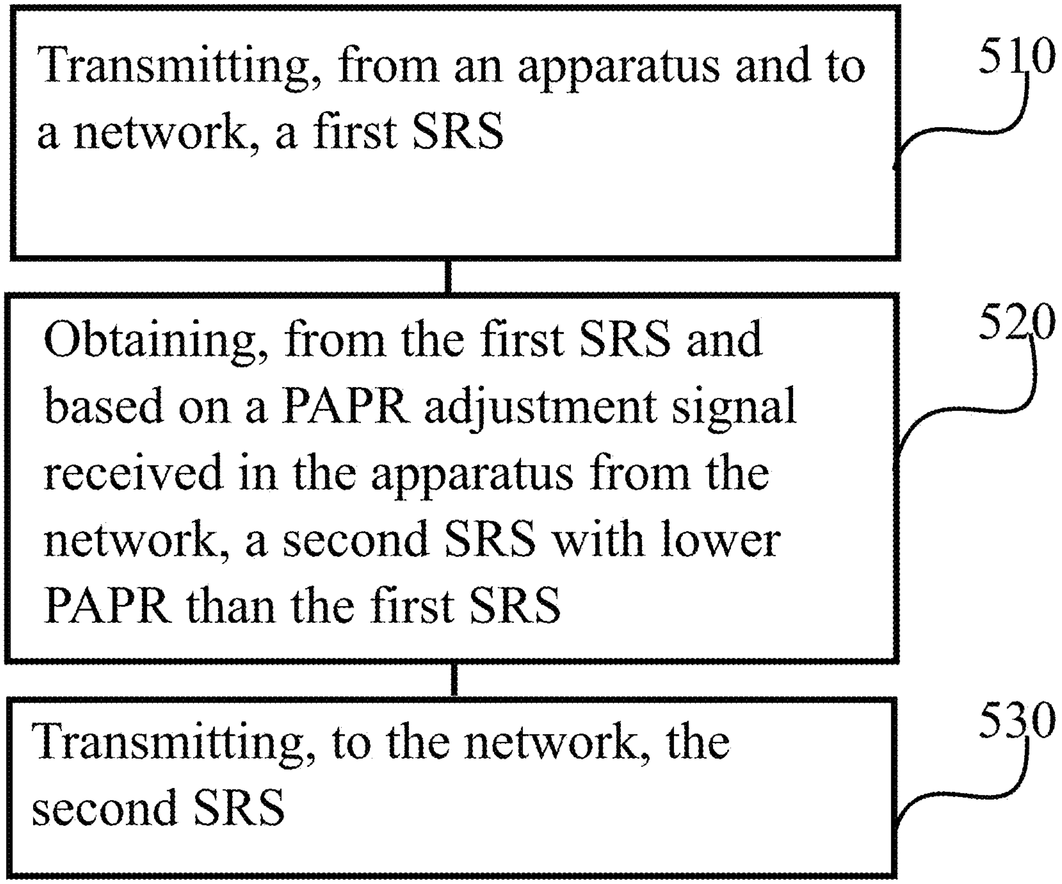
FIG. 5 is a flow graph of a method in accordance with at least some embodiments of the present invention.

FIG. 5 is a flow graph of a method in accordance with at least some embodiments of the present invention. The phases of the illustrated method may be performed in device 110, an auxiliary device or a personal computer, for example, or in a control device configured to control the functioning thereof, when installed therein.

Phase 510 comprises transmitting, from an apparatus and to a network, a first sounding reference signal. Phase 520 comprises obtaining, from the first sounding reference signal and based on a peak-to-average power ratio, PAPR, adjustment signal received in the apparatus from the network, a second sounding reference signal with lower PAPR than the first sounding reference signal. Finally, phase 530 comprises transmitting, to the network, the second sounding reference signal.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases “in one embodiment” or “in an embodiment” in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

At least some embodiments of the present invention find industrial application in managing cellular communication.

ACRONYMS LIST

3GPP 3rd generation partnership project
LPHAP low power high accuracy positioning
OFDM orthogonal frequency division multiplexing
PA power amplifiers
UE user equipment

The invention claimed is:

1. An apparatus comprising at least one processing core and at least one memory storing instructions that, when executed by the at least one processing core, cause the apparatus at least to:

transmit, to a network, a first sounding reference signal;

obtain, by modifying the first sounding reference signal based on a peak-to-average power ratio, PAPR, adjustment signal received in the apparatus from the network, a second sounding reference signal with lower PAPR than the first sounding reference signal, and transmit, to the network, the second sounding reference signal.

2. The apparatus according to claim 1, wherein the apparatus is configured to transmit, to the network, an acknowledgement of having received the PAPR adjustment signal.

3. The apparatus according to claim 1, wherein the apparatus is configured to receive the PAPR adjustment signal from a location management function in a core network of the network, or from a radio access network of the network.

4. The apparatus according to claim 1, further configured to receive, from the network, a second PAPR adjustment signal, to obtain, from the first sounding reference signal or from the second sounding reference signal, a third sounding reference signal based on the second PAPR adjustment signal, wherein the third sounding reference signal has lower PAPR than the second sounding reference signal, and to transmit the third sounding reference signal to the network.

5. The apparatus according to claim 1, wherein the apparatus is configured to perform the obtaining of the second sounding reference signal from the first sounding reference signal using an iterative clipping and filtering, ICF, algorithm.

6. The apparatus according to claim 1, wherein the apparatus is configured to transmit the first sounding reference signal using a first waveform, and to transmit the second sounding reference signal using a second waveform, wherein the second waveform has lower PAPR than the first waveform.

7. An apparatus comprising at least one processing core and at least one memory storing instructions that, when executed by the at least one processing core, cause the apparatus at least to:

receive, from a user equipment, a first sounding reference signal and then a second sounding reference signal, the second sounding reference signal having lower peak-to-average power ratio, PAPR, than the first sounding reference signal, wherein the second sounding reference signal is obtained by modifying the first sounding reference signal based on a PAPR adjustment signal received at the user equipment from the network, and use frequency domain symbols of both the first sounding reference signal and the second sounding reference signal in a positioning or radar process of the user equipment.

8. The apparatus according to claim 7, further configured to provide to the user equipment a PAPR adjustment signal which indicates a difference in PAPR between the first sounding reference signal and the second sounding reference signal.

9. The apparatus according to claim 7, further configured to receive, from the user equipment, a third sounding reference signal, the third sounding reference signal having lower PAPR than the second sounding reference signal, and to employ frequency domain symbols of the third sounding reference signal received in the positioning or radar process of the user equipment.

10. A method comprising:

transmitting, from an apparatus and to a network, a first sounding reference signal;

obtaining, by modifying the first sounding reference signal based on a peak-to-average power ratio, PAPR, adjustment signal received in the apparatus from the network, a second sounding reference signal with lower PAPR than the first sounding reference signal, and transmitting, to the network, the second sounding reference signal.

11. The method according to claim 10, wherein the method comprises transmitting, to the network, an acknowledgement of having received the PAPR adjustment signal.

12. The method according to claim 10, further comprising receiving, from the network, a second PAPR adjustment signal, obtaining, from the first sounding reference signal or from the second sounding reference signal, a third sounding reference signal based on the second PAPR adjustment signal, wherein the third sounding reference signal has lower PAPR than the second sounding reference signal, and transmitting the third sounding reference signal to the network.

* * * * *